United States Patent
Hayama

(10) Patent No.: US 8,730,491 B2
(45) Date of Patent: May 20, 2014

(54) ORIGINAL READING SYSTEM, IMAGE FORMING SYSTEM, AND IMAGE FORMING APPARATUS

(75) Inventor: Satoru Hayama, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/555,827

(22) Filed: Jul. 23, 2012

(65) Prior Publication Data

US 2013/0027728 A1 Jan. 31, 2013

(30) Foreign Application Priority Data

Jul. 26, 2011 (JP) .................................. 2011-163580

(51) Int. Cl.
*G06K 15/02* (2006.01)
(52) U.S. Cl.
USPC ............ 358/1.13; 358/1.9; 358/474; 715/200
(58) Field of Classification Search
None
See application file for complete search history.

(56) References Cited

U.S. PATENT DOCUMENTS

| | | | | |
|---|---|---|---|---|
| 7,057,753 | B1 * | 6/2006 | Kajita et al. ................. | 358/1.15 |
| 7,215,434 | B1 * | 5/2007 | Janse et al. .................. | 358/1.15 |
| 7,295,335 | B2 * | 11/2007 | Arakawa ...................... | 358/1.15 |
| 7,639,409 | B2 * | 12/2009 | Bressler ......................... | 358/474 |
| 7,864,368 | B2 * | 1/2011 | Hinaga .......................... | 358/1.9 |
| 2006/0050302 | A1 | 3/2006 | Sawaguchi | |

FOREIGN PATENT DOCUMENTS

| | | |
|---|---|---|
| JP | 2001-238061 A1 | 8/2001 |
| JP | 2001238061 A | 8/2001 |
| JP | 2006-072892 A1 | 3/2003 |
| JP | 2004-357241 A1 | 12/2004 |
| JP | 2004357241 A | 12/2004 |
| JP | 200672892 A | 3/2006 |
| JP | 2006-209314 A1 | 8/2006 |
| JP | 2006209314 A | 8/2006 |
| JP | 2006-252331 A | 9/2006 |

OTHER PUBLICATIONS

Communication from foreign patent office for a counter-part foreign application, dated Nov. 12, 2013.
English machine translation of JP 2001-238061.
English machine translation of JP 2004-357241.
English machine translation of JP 2006-209314.
English machine translation of JP 2006-72892.
Office Action mailed Nov. 12, 2013 in corresponding Japanese Patent Application No. 2011-163580.

* cited by examiner

*Primary Examiner* — Ashish K Thomas
(74) *Attorney, Agent, or Firm* — Knobbe Martens Olson & Bear LLP

(57) ABSTRACT

An original reading system includes an original reading unit, a storage unit, a display portion, a selection unit, and a control unit. The original reading unit reads an image of an original to generate image data. The storage unit stores name data regarding a name that is assigned to the image data. The storage unit can store the image data. The display portion displays a name based on the name data stored in the storage unit. The selection unit selects a name displayed on the display portion. The control unit sets the name selected by way of the selection unit as a name of the image data generated by the original reading unit, and stores the image data into the storage unit.

2 Claims, 8 Drawing Sheets

ORIGINAL READING SYSTEM, IMAGE FORMING SYSTEM, AND IMAGE FORMING APPARATUS

INCORPORATION BY REFERENCE

This application is based on and claims the benefit of priority from Japanese Patent Application No. 2011-163580, filed on 26 Jul. 2011, the content of which is incorporated herein by reference.

BACKGROUND

The present disclosure relates to an original reading system that reads an image of an original to generate image data, an image forming system including the original reading system, and an image forming apparatus including the original reading system.

Some image forming apparatuses such as multifunction peripherals include: an original reading unit that reads an image of an original to generate image data; and a storage unit that stores the image data thus generated. With some of such image forming apparatuses, in a case in which image data (first image data) is stored in the storage unit, and a name identical to the name of the first image data is set to another image data (second image data) that is already stored in the storage unit, for example, a sequential number is added to the name that is set by a user, and such a name is set as a name of the first image data (Related Art 1).

However, with the image forming apparatus of Related Art 1, it is troublesome for a user to operate an operation unit to input characters when setting a name of the image data, and a wrong character may be input. Furthermore, with the image forming apparatus of Related Art 1, since the user must input a name each time the original reading unit reads a plurality of types of originals, the setting of the name takes time.

SUMMARY

The original reading system of the present disclosure includes an original reading unit, a storage unit, a display portion, a selection unit, and a control unit. The original reading unit reads an image of an original to generate image data. The storage unit stores name data regarding a name that is assigned to the image data. The storage unit can store the image data. The display portion displays a name, based on the name data stored in the storage unit. The selection unit selects a name displayed on the display portion. The control unit sets the name selected by way of the selection unit as a name of the image data generated by the original reading unit, and stores the image data into the storage unit.

DETAILED DESCRIPTION

Figure 1:
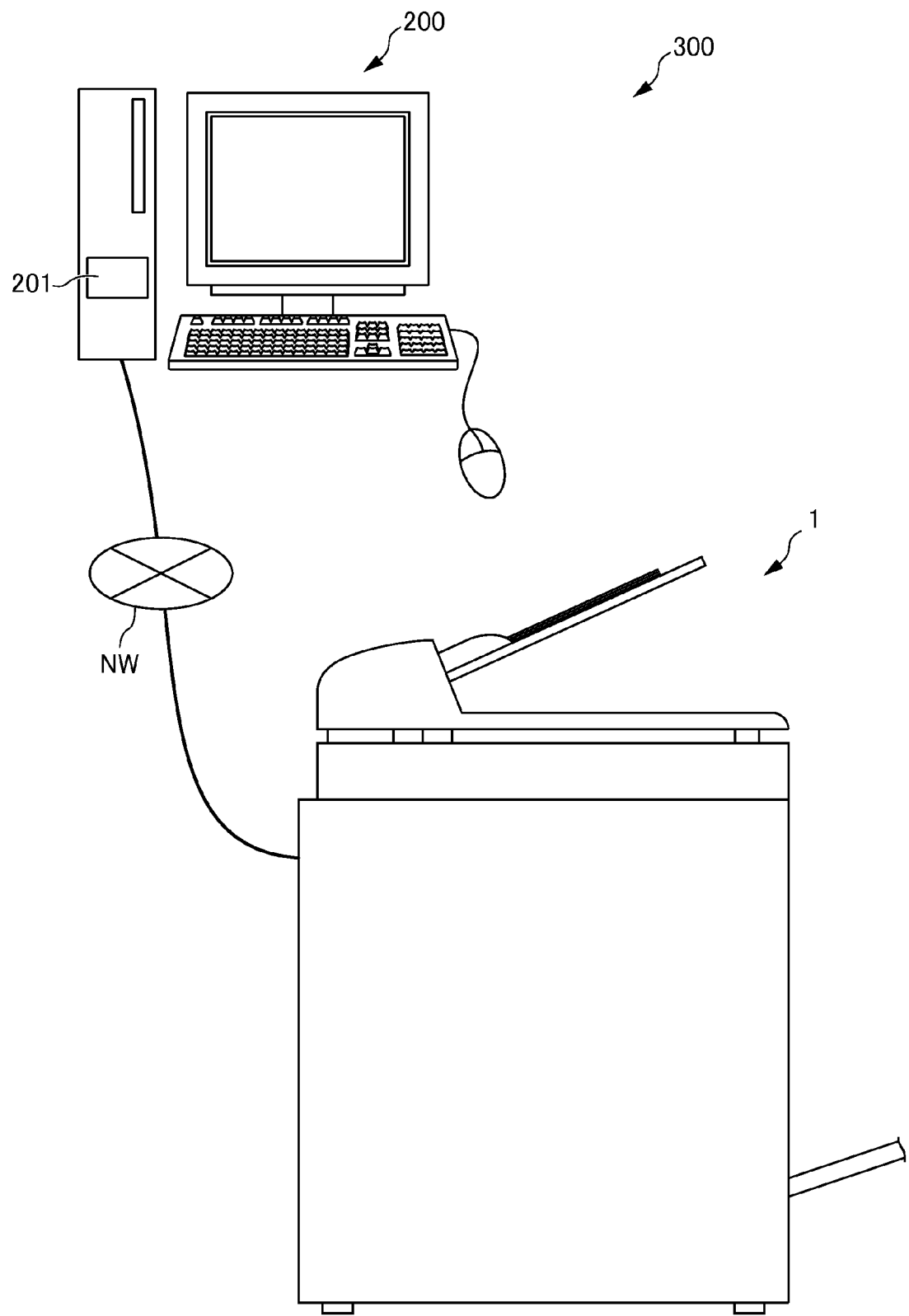
FIG. 1 is a diagram for illustrating an overall configuration of an image forming system according to an embodiment of the present disclosure.
Figure 2:
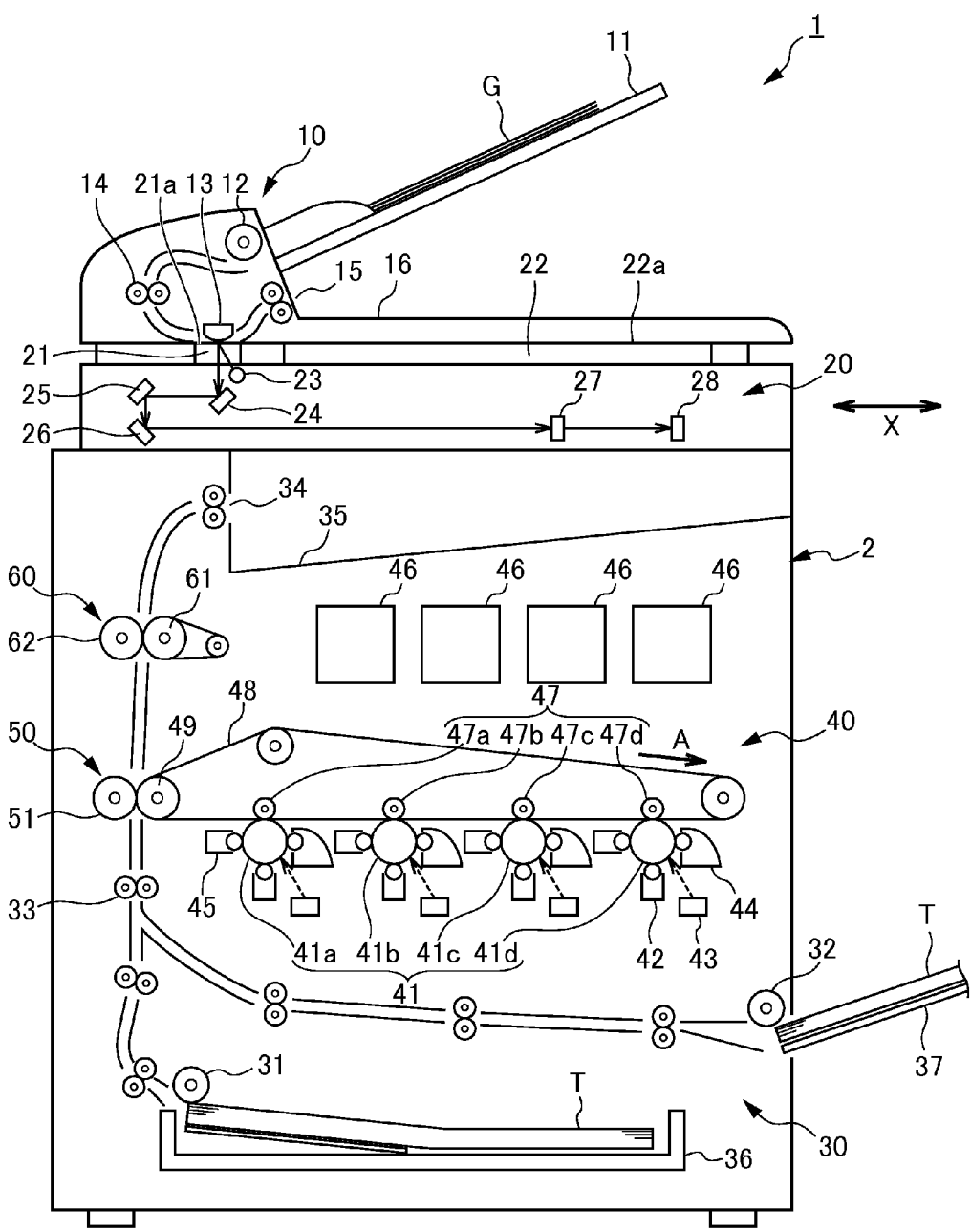
FIG. 2 is a diagram for illustrating an example of a multifunction peripheral.

An embodiment of an image forming system of the present disclosure is described hereinafter with reference to the drawings. First of all, FIG. 1 is a diagram for illustrating an overall configuration of an image forming system 300 according to an embodiment of the present disclosure. FIG. 2 is a diagram for illustrating an example of a multifunction peripheral 1.

As shown in FIG. 1, the image forming system 300 includes the multifunction peripheral 1 as an example of the image forming apparatus, and a terminal device 200.

The terminal device 200 is configured by a personal computer and the like. The terminal device 200 communicates with the multifunction peripheral 1 via a communication network NW such as a local area network. With the terminal device 200, as a result of utilizing an application stored in a storage unit 201, data is created and stored into the storage unit 201. The data is, for example, text data, spreadsheet data, image data or the like. Moreover, the storage unit 201 is capable of storing image data of an original that is read by an original reading unit 20 (to be described below) of the multifunction peripheral 1.

As shown in FIG. 2, the multifunction peripheral 1 includes an original conveying unit 10, the original reading unit 20, a sheet conveying unit 30, an image forming unit 40, a transfer unit 50, and a fixing unit 60.

The original conveying unit 10 is composed of an automatic document feeder (ADF), and includes an original mounting unit 11, a first feed roller 12, a guide 13, a timing roller pair 14, and an original discharge unit 15. The first feed roller 12 sequentially supplies an original G mounted on the original mounting unit 11 to the timing roller pair 14, on a sheet by sheet basis. The timing roller pair 14 conveys the original G or stops the conveyance of the original G, such that the timing of reading an image of the original G by the original reading unit 20 coincides with the timing of supplying the original G to the position for reading the image of the original G by the original reading unit 20 (a position in which the guide 13 is disposed). The guide 13 introduces the original G thus conveyed to a first reading surface 21a (to be described below). The original discharge unit 15 discharges an original G of which image is read by the original reading unit 20 (passed through the guide 13) to the outside of a multifunction peripheral main body 2.

In the original discharge unit 15, an original accumulation unit 16 is formed on an outer side of the multifunction peripheral main body 2. An original G discharged from the original discharge unit 15 is stacked and collected in the original accumulation unit 16.

The original reading unit 20 includes the first reading surface 21a and a second reading surface 22a. The first reading surface 21a is formed along the upper surface of a first contact glass 21 disposed to face the guide 13, and serves as a reading surface for reading an image of the original G. The second reading surface 22a is disposed adjacently to the first reading surface 21a (as shown in FIG. 2, along a large part of the right side of the first reading surface 21a). The second reading surface 22a is used for reading an image of the original G without using the original conveying unit 10. The second reading surface 22a is formed along the upper surface of a second contact glass 22 mounting the original G, and serves as a reading surface for reading an image of the original G.

The original reading unit 20 includes an illumination unit 23, a first mirror 24, a second mirror 25, a third mirror 26, an imaging lens 27, and an image capture unit 28, all of which are provided inside the multifunction peripheral main body 2. Each of the illumination unit 23 and the first mirror 24 moves in a sub-scanning direction X. The second mirror 25 and the third mirror 26 are disposed on the left side of the illumination unit 23 and the first mirror 24, in FIG. 2. Furthermore, each of the second mirror 25 and the third mirror 26 moves in the sub-scanning direction X while maintaining a fixed distance (an optical path length) from the first reading surface 21a or the second reading surface 22a to the image capture unit 28, the optical path passing through the first mirror 24, the second mirror 25, the third mirror 26, and the imaging lens 27.

The illumination unit 23 is a light source that illuminates light onto the original G. The first mirror 24, the second mirror 25, and the third mirror 26 are mirrors that maintain a fixed optical path length while introducing light reflected by the original G to the imaging lens 27. When light is incident from the third mirror 26, the imaging lens 27 images the light onto the image capture unit 28. The image capture unit 28 is an image sensor for obtaining image data based on a focused light image, by converting the incident light into an electrical signal. The image capture unit 28 is, for example, a charge coupled device (CCD) or complementary metal oxide semiconductor (CMOS).

In accordance with control by a control unit 90 (to be described below), the original reading unit 20 outputs image data generated by the image capture unit 28 to main memory 80 (to be described below) or the storage unit 201 of the terminal device 200. Here, for example, in a case in which a copy or facsimile of the original G is intended to be made, the original reading unit 20 transmits the image data to the main memory 80, and in a case in which image data of the original G is intended to be created, the original reading unit 20 transmits the image data to the storage unit 201.

The sheet conveying unit 30 includes a second feed roller 31, a third feed roller 32, a registration roller pair 33, and a sheet discharge unit 34. The second feed roller 31 supplies a paper sheet T (a transfer medium) contained in the sheet cassette 36 to the transfer unit 50. The third feed roller 32 supplies a paper sheet T (a transfer medium) mounted on a manual feed tray 37 to the transfer unit 50. The registration roller pair 33 conveys the paper sheet T or stops the conveyance of the paper sheet T, such that the timing when a toner image arrives at the transfer unit 50 coincides with the timing when the paper sheet T is supplied to the transfer unit 50. The registration roller pair 33 corrects skew (inclination of the supplied paper) of the paper sheet T. The sheet discharge unit 34 discharges the paper sheet T with a toner image being fixed thereon to the outside of the multifunction peripheral main body 2. A discharged-sheet accumulation unit 35 is formed on an outer side of the multifunction peripheral main body 2 in the sheet discharge unit 34. The paper sheet T discharged from the sheet discharge unit 34 is stacked and collected in the discharged-sheet accumulation unit 35.

The image forming unit 40 is intended for forming a toner image, and includes a photosensitive drum 41, a charging member 42, a laser scanning unit 43, a developing unit 44, a cleaning unit 45, a toner cartridge 46, a primary transfer roller 47, an intermediate transfer belt 48, and a counter roller 49.

The photosensitive drums 41 (41a, 41b, 41c and 41d) function as photosensitive bodies or image supporting bodies to form toner images of black, cyan, magenta and yellow, respectively. The charging member 42, the laser scanning unit 43, the developing unit 44 and the cleaning unit 45 are disposed in this order from upstream to downstream along the rotation direction of the photosensitive drums 41, around the periphery of each of the photosensitive drums 41a, 41b, 41c and 41d. The charging member 42 charges the surface of the photosensitive drum 41. The laser scanning unit 43 is disposed at a distance from the surface of the photosensitive drum 41, and the surface of the photosensitive drum 41 is scanned and exposed based on the image data regarding the original G that is read by the original reading unit 20. In this manner, a charge on the exposed portion is eliminated to form an electrostatic latent image on the surface of the photosensitive drum 41. The developing unit 44 form a toner image by attaching toners to the electrostatic latent image formed on the surface of the photosensitive drum 41. After the static charge is eliminated from the surface of the photosensitive drum 41 by a charge eliminator (not shown), the cleaning unit 45 removes residual toners and the like from the surface.

The toner cartridge 46 contains toners of respective colors supplied to the developing unit 44. The toner cartridge 46 and the developing unit 44 are connected with each other via a toner supply passage (not shown).

The primary transfer roller 47 (47a, 47b, 47c and 47d) is disposed opposite to the photosensitive drum (41a, 41b, 41c and 41d), with a part of the intermediate transfer belt 48 being sandwiched therebetween. The intermediate transfer belt 48 is a belt passing through the image forming unit 40 and the transfer unit 50. A part of the intermediate transfer belt 48 is sandwiched between the photosensitive drums 41a, 41b, 41c and 41d and the primary transfer rollers 47a, 47b, 47c and 47d, respectively, as a result of which the toner image formed on the surface of each of the photosensitive drums 41a, 41b, 41c and 41d is primarily transferred onto the intermediate transfer belt 48. The counter roller 49 is a drive roller disposed on an inner side of the intermediate transfer belt 48 having an annular shape, and is intended for moving the intermediate transfer belt 48 in the direction of an arrow A shown in FIG. 2.

The transfer unit 50 includes a secondary transfer roller 51. The secondary transfer roller 51 is disposed opposite to the counter roller 49, with a part of the intermediate transfer belt 48 being sandwiched between the secondary transfer roller 51 and the counter roller 49. The secondary transfer roller 51 secondarily transfers the toner image, which was primarily transferred onto the intermediate transfer belt 48, onto the paper sheet T.

The fixing unit 60 includes a heating rotational member 61 and a pressuring rotational member 62. The heating rotational member 61 and the pressuring rotational member 62 sandwich the paper sheet T, onto which the toner image was secondarily transferred, and melt and pressurize the toner to fix the toner on the paper sheet T.

Figure 3:
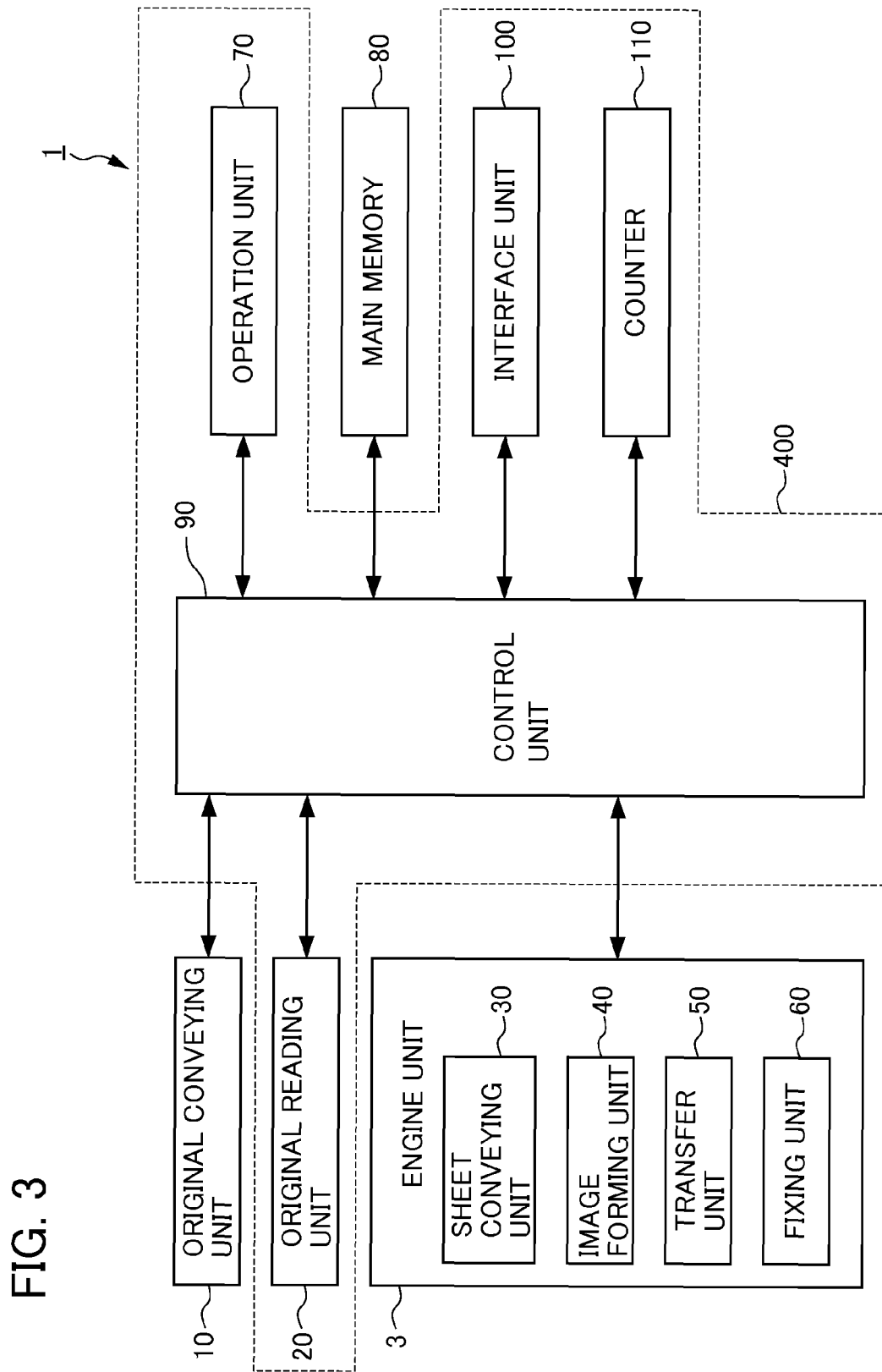
FIG. 3 is a block diagram showing a functional configuration of the multifunction peripheral.
Figure 4:
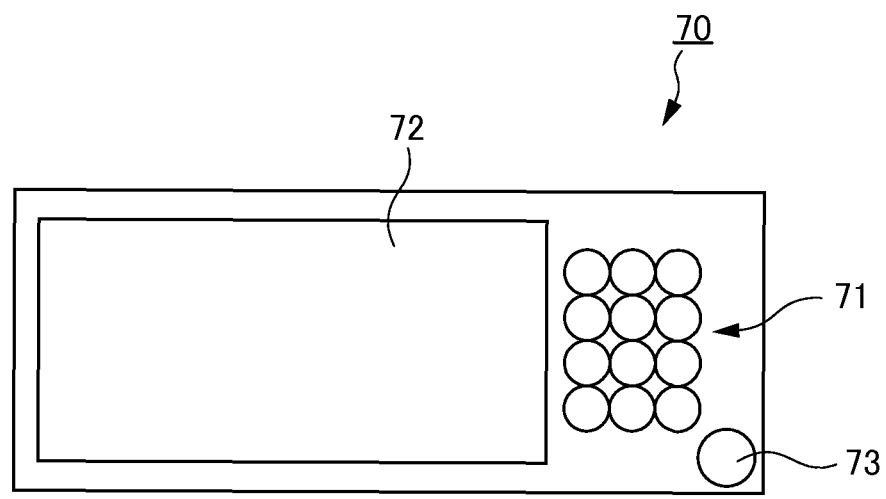
FIG. 4 is a diagram for illustrating an operation unit.

Next, a functional configuration of the multifunction peripheral 1 is described. FIG. 3 is a block diagram showing the functional configuration of the multifunction peripheral 1. FIG. 4 is a diagram for illustrating an operation unit 70.

The multifunction peripheral 1 includes the constituent elements as described above (i.e. the original conveying unit 10, the original reading unit 20, the sheet conveying unit 30, the image forming unit 40, the transfer unit 50, and the fixing unit 60). An engine unit 3 is configured by the sheet conveying unit 30, the image forming unit 40, the transfer unit 50, and the fixing unit 60. Descriptions are omitted for the constituent elements already described with reference to FIG. 2.

As shown in FIG. 3, in addition to the functional configuration described above, the multifunction peripheral 1 further includes the operation unit 70, the main memory 80, the control unit 90, and an interface unit 100.

As shown in FIG. 4, the operation unit 70 includes: a numeric keypad 71 that also functions as a selection unit; a touch panel 72 that also functions as a display portion and a selection unit; and a start key 73. The numeric keypad 71 is operated for inputting numbers of print copies and the like. The touch screen 72 displays a plurality of keys or the like that are assigned with various functions (for example, a function of setting a copy magnification, a function of allocating a plurality of pages to a single paper sheet T (2 in 1 or the like)). The keys displayed on the touch screen 72 are operated for causing the multifunction peripheral 1 to execute any of the various functions. The start key 73 is operated for executing printing. As a result of operating any of the keys, the operation unit 70 transmits a signal, which indicates that the key was operated, to the control unit 90.

As shown in FIG. 3, the main memory 80 stores image data based on an original G read by the original reading unit 20. The main memory 80 stores a control program used in the multifunction peripheral 1, data used by the control program, and the like.

The interface unit 100 is connected to the communication network NW.

The control unit 90 controls the original conveying unit 10, the original reading unit 20, the engine unit 3, the operation unit 70, and the like.

Such an image forming system 300 (the multifunction peripheral 1) includes an original reading system 400 according to an embodiment of the present disclosure.

The original reading system 400 includes the original reading unit 20, the operation unit 70, the control unit 90, the interface unit 100, the storage unit 201 (see FIG. 1), and a counter 110 (a counting unit) to be described below.

The original reading system 400 is hereinafter described.

As described above, the original reading unit 20 reads an image of an original G to generate image data. As described above, the storage unit 201 is capable of storing image data generated by the original reading unit 20. Furthermore, the storage unit 201 stores name data regarding a name that is assigned to image data. It is preferable for the name data to be, for example, data created by an application. As a specific example, the name data is data such as text data created by a text application, spreadsheet data created by a spreadsheet application, and image data created by an image creation application. The name data may not necessarily be data created by an application stored in the storage unit 201, but may be data created by an application stored in another terminal device and copied into the storage unit 201 of the original reading system 400. Moreover, it is preferable for a name based on the name data to be a main portion of a name assigned to data created by an application, excluding an extension corresponding to the application. As a specific example, in a case in which a file name of the name data is "experiment report.txt", a name based on the name data is its main portion "experiment report" excluding the extension ".txt".

Figure 5A:
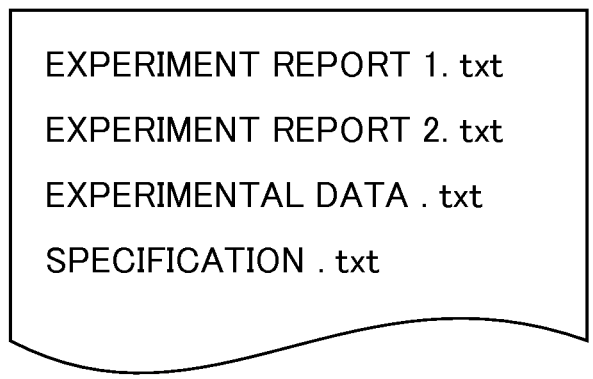
FIG. 5 is a diagram for illustrating name data and a name of the name data.
Figure 5B:
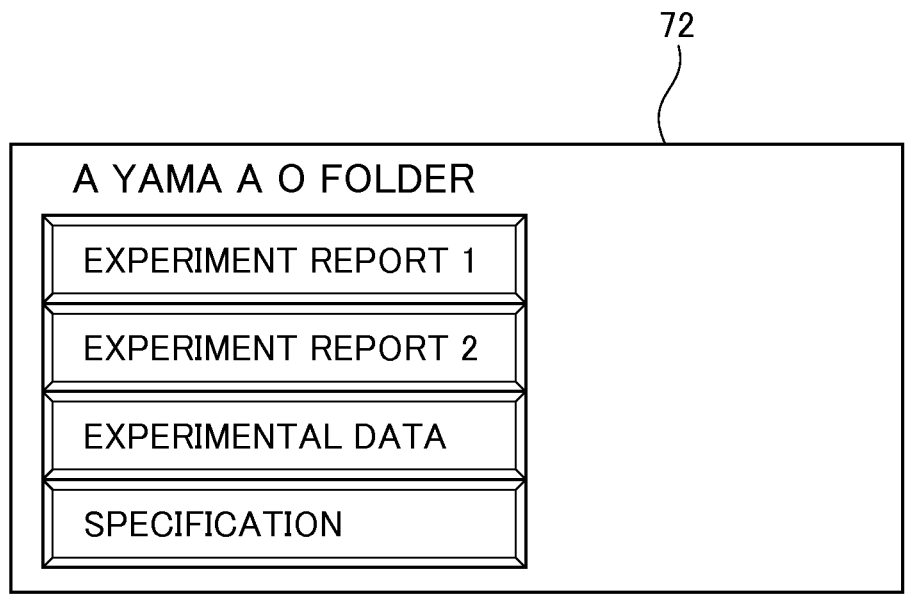

The touch screen 72 (the display portion) configuring the operation unit 70 displays a name based on name data stored in the storage unit 201. As an example, in a case in which four pieces of name data ("experiment report 1.txt", "experiment report 2.txt", "experimental data.txt" and "specification.txt") are stored in the storage unit 201 as shown in FIG. 5A, the touch screen 72 displays names ("experiment report 1", "experiment report 2", "experimental data" and "specification") of the name data as shown in FIG. 5B.

Moreover, the touch screen 72 (the selection unit) or the numeric keypad 71 (the selection unit) configuring the operation unit 70 selects a name displayed on the touch screen 72. When the touch screen 72 or the numeric keypad 71 is operated by a user, any one name, for example, "experiment report 1" is selected from the names ("experiment report 1", "experiment report 2", "experimental data" and "specification") displayed on the touch screen 72.

The counter 110 shown in FIG. 3 counts a generation frequency of image data that is generated each time an image of an original is read by the original reading unit 20. More specifically, the counter 110 increases the count by 1, each time an image data is generated by reading an image of an original G.

When a name is selected by way of the touch screen 72 or the numeric keypad 71, the control unit 90 sets the name as a name of the image data generated by the original reading unit 20, and stores such image data into the storage unit 201. For example, in a case in which the name "experiment report 1" is selected by way of the touch screen 72 or the like, the control unit 90 sets the name of the image data read by the original reading unit 20 as "experiment report 1", and stores the image data with such set name into the storage unit 201. It should be noted that, in addition to the name thus selected, an extension corresponding to the image data can also be assigned to the image data.

Moreover, it is preferable for the control unit 90 to combine a name selected by way of the touch screen 72 or the like with a generation frequency counted by the counter 110, and set the combination as a name of the image data. For example, in a case in which the name "experiment report 1" is selected by way of the touch screen 72 or the like, and the generation frequency counted by the counter 110 is "1", the control unit 90 adds "0001" representing the generation frequency in four digits to "experiment report 1", and sets "experiment report 10001" as a name of the image data. The generation frequency (a sequential number) counted by the counter 110 and set as a part of a name is not limited to four digits as described above, and may have a different number of digits.

Figure 6:
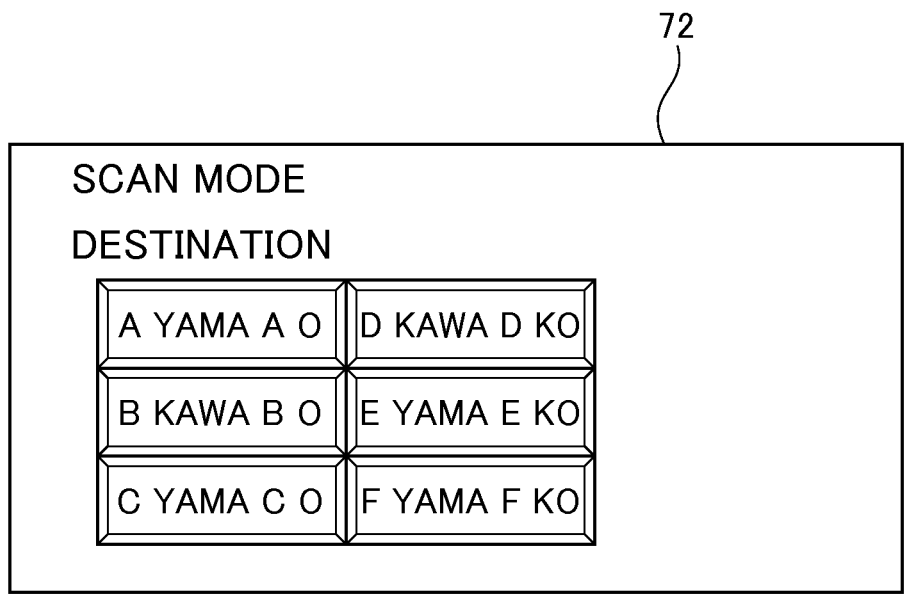
FIG. 6 is a diagram for illustrating destinations of image data.
Figure 7:
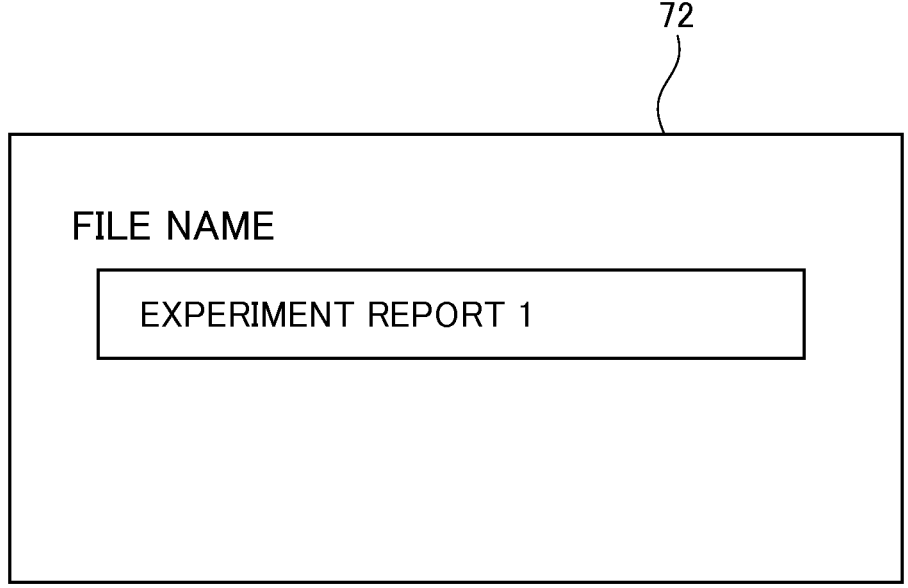
FIG. 7 is a diagram for illustrating a selected name.
Figure 8:
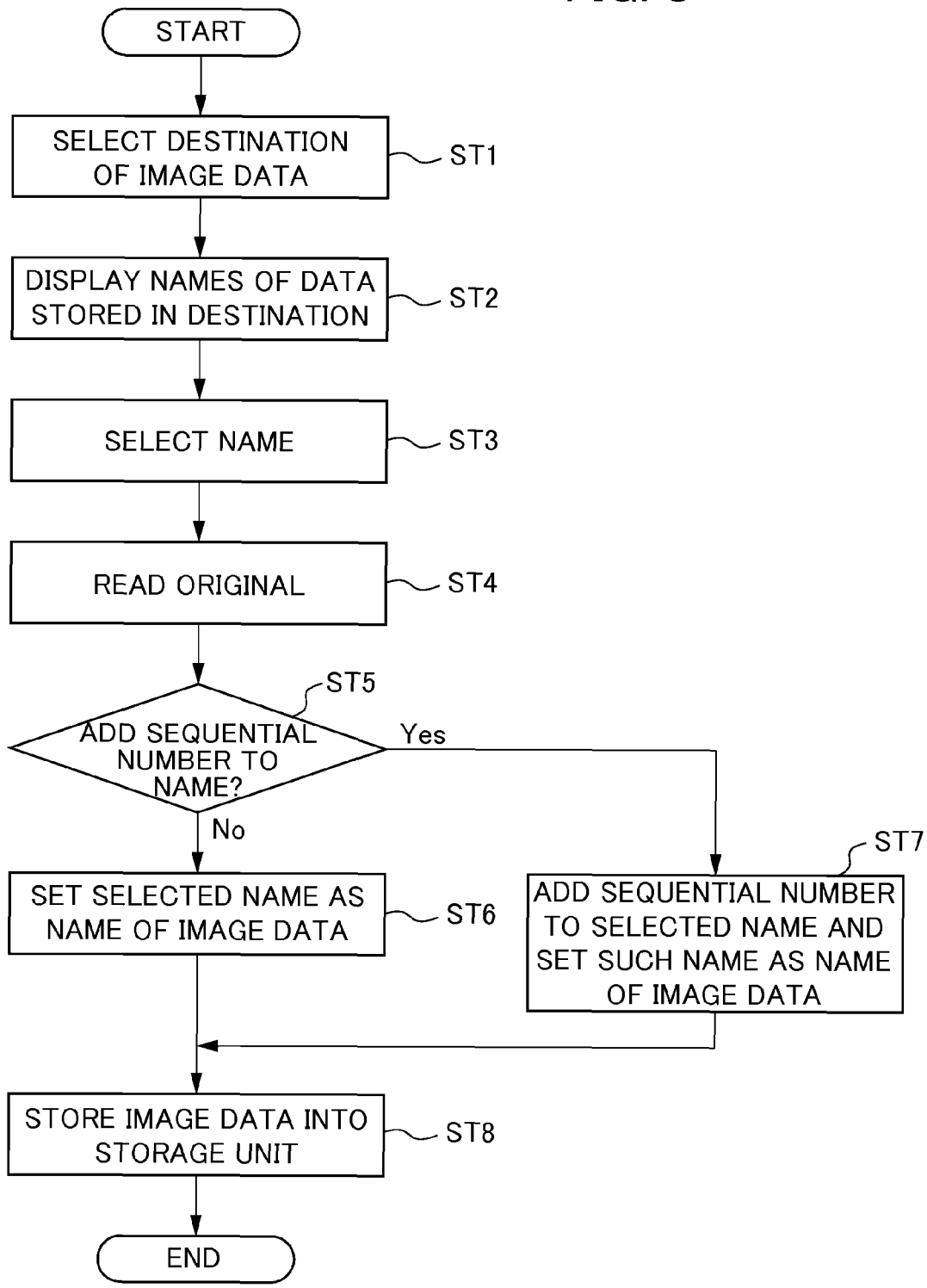
FIG. 8 is a flowchart for illustrating operations of an original reading system.

Next, operations of the original reading system 400 (the multifunction peripheral 1) in the present embodiment are described. FIG. 5 is a diagram for illustrating name data and a name of the name data. FIG. 6 is a diagram for illustrating destinations of image data. FIG. 7 is a diagram for illustrating a selected name. FIG. 8 is a flowchart for illustrating operations of the original reading system 400.

In Step ST1 shown in FIG. 8, the touch screen 72 or the numeric keypad 71 prompts a user to select a destination of image data generated by the original reading unit 20. More specifically, as shown in FIG. 6, the control unit 90 causes the touch screen 72 to display folder names of a plurality of folders stored in the storage unit 201 (for example, personal folder names "A YAMA A O" "B KAWA B O", "C KAWA C O", "D KAWA D KO", "E YAMA E KO", "F YAMA F KO"). In addition, based on an operation of the touch screen 72 or the numeric keypad 71 by the user, the control unit 90 selects a folder name from the plurality of folder names. A folder with a selected folder name assigned thereto will serve as a folder, into which image data is stored. Here, it is assumed that the folder "A YAMA A O" is selected by way of the touch screen 72 or the like.

In Step ST2, the touch screen 72 displays names of data stored in the destination (folder) that was selected in Step ST1. More specifically, in a case in which the name data "experiment report 1.txt", "experiment report 2.txt", "experimental data.txt" and "specification.txt" is stored in the folder "A YAMA A O" as shown in FIG. 5A, the touch screen 72 displays the names "experiment report 1", "experiment report 2", "experimental data" and "specification" of the name data as shown in FIG. 5B. Here, the names displayed on the touch screen 72 may include extensions of the name data, and may not include extensions of the name data as shown in FIG. 5B.

In Step ST3, the control unit 90 selects any one of the plurality of names displayed on the touch screen 72, based on an operation of the touch screen 72 or the numeric keypad 71 by the user. In a case in which a name is selected, the touch screen 72 displays the name thus selected, as shown in FIG. 7.

In Step ST4, the original reading unit 20 reads an image of an original G to generate image data, based on an operation of the start key 73 for example.

In Step ST5, in a case in which a name is set to the image data generated in Step ST4, the control unit 90 determines whether a sequential number is added thereto. More specifically, the control unit 90 determines whether it has been set to add a sequential number to the name of the image data. In a case in which a sequential number is not added (No), the processing advances Step ST6. In a case in which a sequential number is added (Yes), the processing advances Step ST7.

In Step ST6, the control unit 90 sets the name, which was selected in Step ST3, as the name of the image data.

On the other hand, in Step ST7, the control unit 90 sets the name, which was selected in Step ST3 and added with a sequential number, as the name of the image data. More specifically, the control unit 90 reads a generation frequency of the image data by referring to the counter 110, adds the generation frequency to the name selected in Step ST3, and sets such a name as the name of the image data.

In Step ST8, the control unit 90 stores the image data with the set name into the storage unit 201.

As described above, the original reading system 400 (the multifunction peripheral 1) according to the present embodiment achieves effects as follows.

More specifically, according to the original reading system 400 of the present embodiment, a name selected by way of the touch screen 72 or the numeric keypad 71 is set as a name of image data generated by the original reading unit 20, and such image data is stored into the storage unit 201. In this case, it is preferable for a name selected by way of the touch screen 72 or the like to be a main portion of a name assigned to data created by an application, excluding an extension corresponding to the application. As a result, with the original reading system 400, a name of image data can be easily set.

Moreover, the original reading system 400 combines a name selected by way of the touch screen 72 or the like with a generation frequency counted by the counter 110, and sets such a combination as a name of the image data. As a result, the original reading system 400 can clearly show the difference between the name of the name data stored in the storage unit 201, and the name assigned to image data generated by the original reading unit 20.

Furthermore, the present disclosure is not limited to the abovementioned embodiment, and can be carried out in various modes.

The above embodiment has been described for a case, in which the original reading unit 20, the operation unit 70 (the display portion and the selection unit) and the control unit 90 are disposed in the image forming apparatus (the multifunction peripheral 1) that includes the engine unit 3 for forming an image on the paper sheet T based on the image data, and the storage unit 201 is disposed in the terminal device 200 that is connected to the multifunction peripheral 1 via a communication network. However, the original reading system 400 may be disposed only in the image forming apparatus (the multifunction peripheral). More specifically, the original reading unit, the storage unit, the display portion, the selection unit and the control unit may be disposed in the housing that includes the engine unit for forming an image on the paper sheet T based on the image data. In this case, the image data stored in the storage unit can be transported out of the multifunction peripheral via USB (Universal Serial Bus) memory.

In addition, the above embodiment has been described for a case, in which a generation frequency counted by the counter 110 can be added to the name of the image data. However, in the present disclosure, in place of a generation frequency counted by the counter 110, the time of day of reading the original G by the original reading unit 20 may be added to the name of the image data.

The multifunction peripheral 1 according to the present embodiment is a color multifunction peripheral; however, it is not limited to this configuration, and may be a monochrome multifunction peripheral.

The multifunction peripheral 1 according to the present embodiment transfers a toner image onto a paper sheet T via the intermediate transfer belt 48 (an indirect transfer configuration); however, it is not limited to this configuration, and the toner image formed by the photoreceptor drum may be directly transferred onto the paper sheet T (a direct transfer configuration).

The multifunction peripheral 1 according to the present embodiment is configured to print an image on one side of the paper sheet T; however, it is not limited to this configuration, and a image may be printed on both sides of the paper sheet T.

The image forming apparatus according to the present disclosure is not limited to the multifunction peripheral 1 described above. More specifically, the image forming apparatus of the present disclosure may be a facsimile or a copying machine.

Furthermore, the multifunction peripheral 1 described in the present embodiment is configured to use a toner; however, the present disclosure is not limited to this configuration. More specifically, the image forming apparatus may be a multifunction peripheral of an ink jet type, in which an ink is ejected from an ink jet head to be attached to a paper sheet.

Furthermore, the transfer medium, onto which the toner image is fixed by the image forming apparatus according to the present disclosure, is not limited to a paper sheet T, and may include, for example, a plastic sheet such as an OHP (overhead projector) sheet. Moreover, the transfer medium is not limited to a sheet-like medium, and may be a roll-like medium.

What is claimed is:

1. An image forming system including an image forming apparatus and a terminal device that is connected to the image forming apparatus via a communication network, comprising:
   an original reading unit that reads an image of an original to generate image data;
   a storage unit capable of storing name data regarding a name assigned to the image data, and storing the image data;
   a display portion that displays a name based on the name data stored in the storage unit;
   a selection unit that selects a name displayed on the display portion; and
   a control unit that sets the name selected by way of the selection unit as a name of the image data generated by the original reading unit, and stores the image data into the storage unit;
   wherein the original reading unit, the display portion, the selection unit and the control unit are disposed in the image forming apparatus that includes an engine unit for forming an image on a transfer medium based on the image data, wherein the storage unit is disposed in the terminal device, and wherein the name data stored in the storage unit is data for a file created by an application operating at the terminal device, and a name based on the name data is a main portion of the name assigned to the data created by the application, excluding an extension corresponding to the application.

2. The original reading system according to claim 1, further comprising:

a counting unit that counts a generation frequency of image data that is generated each time an image of an original is read by the original reading unit, wherein the control unit combines the name selected by way of the selection unit with the generation frequency counted by the counting unit, and sets such a combination as a name of the image data.

* * * * *